United States Patent [19]

Halter

[11] Patent Number: 4,784,590

[45] Date of Patent: Nov. 15, 1988

[54] FOIL-BLOWING APPARATUS WITH IMPROVED COOLING

[75] Inventor: Hartmut Halter, Troisdorf-Eschmar, Fed. Rep. of Germany

[73] Assignee: Reifenhauser GmbH & Co. Maschinenfabrik, Troisdorf, Fed. Rep. of Germany

[21] Appl. No.: 72,462

[22] Filed: Jul. 13, 1987

[30] Foreign Application Priority Data

Jul. 12, 1986 [DE] Fed. Rep. of Germany ....... 3623548

[51] Int. Cl.$^4$ ...................... B29C 47/24; B29C 47/88
[52] U.S. Cl. .................. 425/72.1; 264/209.2; 264/569; 425/326.1; 425/387.1
[58] Field of Search ................. 425/72 R, 325, 378 R, 425/376 B, 381, 387.1, 326.1; 264/209.2, 565, 566, 569

[56] References Cited

U.S. PATENT DOCUMENTS

| | | | |
|---|---|---|---|
| 3,548,042 | 12/1970 | Hinrichs | 425/72 R X |
| 3,568,252 | 3/1971 | Masuda et al. | 264/569 X |
| 3,947,170 | 3/1976 | Zimmermann | 425/72 R |
| 4,272,231 | 6/1981 | Schott, Jr. | 425/72 R |
| 4,330,501 | 5/1982 | Jones et al. | 425/72 R X |
| 4,606,879 | 8/1986 | Cerisano | 264/569 X |
| 4,624,823 | 11/1986 | Audureau et al. | 425/72 R X |

FOREIGN PATENT DOCUMENTS

| | | | |
|---|---|---|---|
| 2725832 | 12/1978 | Fed. Rep. of Germany | 425/72 R |
| 212918 | 12/1983 | Japan | 264/569 |
| 304140 | 9/1971 | U.S.S.R. | 425/72 R |

*Primary Examiner*—Richard L. Chiesa
*Attorney, Agent, or Firm*—Herbert Dubno

[57] ABSTRACT

The apparatus for making a plastic foil by blowing into an extruded thermoplastic tube comprises a rotating extruder head with at least one circular outlet gap for the plastic tube, an air blowing device and a cooling device including two circular cooling air outlets surrounding the circular outlet gap of the extruder head. Cooling air duct structures are connected to a common cooling air blower. A cooling air distributor unit has a cooling air feed device for each cooling air outlet. The cooling air feed devices are aerodynamically independent of each other. The aerodynamically independent cooling air feed devices are connected to a common cooling air duct structure. Each cooling air feed device has an air flow control device.

8 Claims, 2 Drawing Sheets

FOIL-BLOWING APPARATUS WITH IMPROVED COOLING

FIELD OF THE INVENTION

My invention relates to an apparatus for making a thermoplastic foil and, more particularly, to a foil-blowing apparatus with improved cooling.

BACKGROUND OF THE INVENTION

An apparatus for making a plastic foil by blowing an extruded tube into an expanded thermoplastic tube which can be flattened, generally comprises a rotating extruder head with at least one circular outlet for the extruded thermoplastic tube, an air blowing device for inflating the tube and a cooling device including two or more circular cooling air outlets surrounding the circular outlet gap of the extruder head. Cooling air duct structures are connected to air blowers. The cooling device can be held fixed or can rotate in the same direction as or counter to the extruder head.

In the known apparatus an aerodynamically central cooling air feed device is provided which supplies all the circular cooling air outlets.

The cooling air flows issuing from the individual cooling air outlets are not controllable independently of each other and of course not when the cooling air outlets have a single control device. This impairs the homogeneous cooling of the foil tube over its circumference.

To eliminate this disadvantage a separate blower could be provided at each cooling outlet with a separate system of feed ducts from the blower to its cooling air outlet. This however is unnecessarily expensive.

OBJECTS OF THE INVENTION

It is an object of my invention to provide an improved foil-blowing apparatus in which the drawbacks of earlier cooling arrangements are obviated.

It is also an object of my invention to provide an improved apparatus for making a thermoplastic foil in which the cooling air flows issuing from the individual circular cooling air outlets are controllable separately and independently from each other so that a very uniform homogeneous cooling of the tubular foil can be provided over its entire circumference.

It is another object of my invention to provide an improved apparats for making a thermoplastic foil in which the individual cooling air flows from the individual circular cooling air outlets are controllable separately and independently in an economical and practical way.

SUMMARY OF THE INVENTION

These objects and others which will become more readily apparent hereinafter are attained in accordance with my invention in an apparatus for making a thermoplastic foil by blowing an extruded thermoplastic tube comprising a rotating extruder head with at least one circular outlet gap for the thermoplastic tube, an air blowing device and a cooling device including at least two circular cooling air outlets surrounding the circular outlet gap of the extruder head. Each cooling air duct structure is fed by an air blower.

According to my invention a cooling air distributor unit has a cooling air feed device for each cooling air outlet and the cooling air feed devices are aerodynamically independent of each other.

The aerodynamically independent cooling air feed devices are connected to a common cooling air duct structure and each of the cooling air feed devices has an air flow control device.

Advantageously the air flow control devices are located in the transitional region at the cooling air duct structures.

It is understood that in the apparatus according to my invention a sufficiently powerful blower must be provided and that the cooling air fed in must be provided in sufficient quantity with sufficient static pressure in the cooling air duct structure and upstream of the individual cooling air feed devices. The design of the apparatus according to my invention including that of the blower must follow the laws of aerodynamics.

Advantageously the cooling air feed devices include a circumferentially circular distributor chamber downstream of the air flow control device and, connected thereto a duct leading directly or indirectly by an additional distributor chamber to the associated cooling air outlet.

The air flow control device can be a diaphragm or apertured partition and/or a flap valve which is remotely operable. In the example in which the cooling air feed devices are connected to the cooling air duct upper member by tubes or pipes distributed around the circumference each tube or pipe opening into the cooling air feed devices can be provided with an air flow control device. In the scope of my invention, flow guiding or baffle structures can be located in the distributor chambers.

Advantageously the cooling air flows issuing from the individual circular cooling air outlets are controllable independently of each other so that a very uniform homogeneous cooling of the tubular foil over its entire circumference can be provided.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
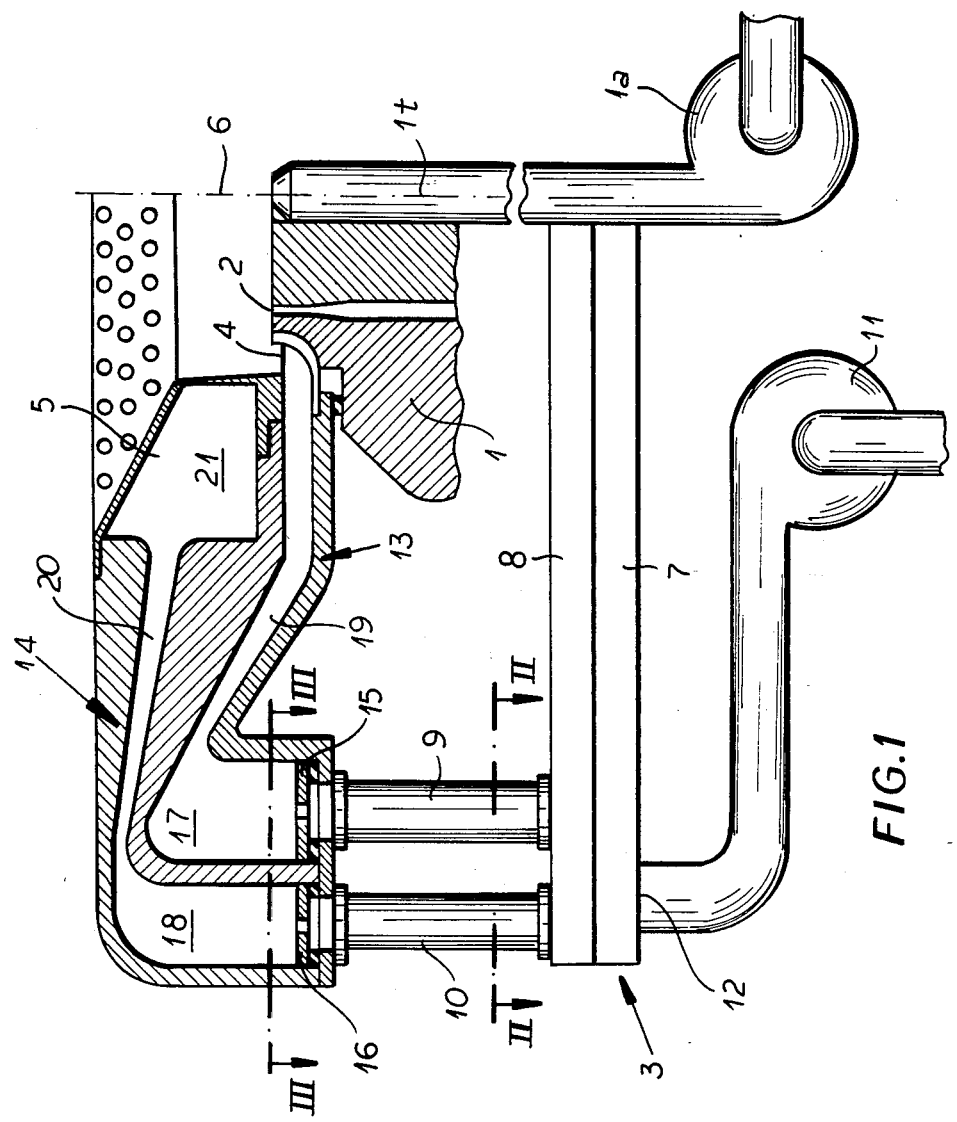
FIG. 1 is a vertical schematic cross sectional view of an apparatus for making a thermoplastic foil according to my invention.

The apparatus shown in the drawing is designed for making a thermoplastic foil by blowing an extruded thermoplastic tubing.

It basically includes a rotating extruder head 1 with a circular outlet gap 2 for the thermoplastic tubing, an air blowing device 1a for blowing the thermoplastic tubing which is connected to a pipe 1t in the extruder head 1, and a cooling device 3, in this example, with two circular cooling air outlets 4, 5 surrounding the outlet gap 2.

The extruder head 1 rotates about the axis 6 indicated on the right hand side of the drawing. The device is rotationally symmetric as far as these rotating parts are concerned.

The cooling device 3 (driven by motor 20, FIG. 2) rotates similarly in this example.

The cooling device 3 has a cooling air duct structure with a stationary cooling air conduit lower member or distributor ring 7 and a rotating cooling air conduit upper member consisting of two rings 8, 8a driven by motor 20.

A cooling air distributor unit 13, 14 is connected by tubes or pipes 9, 10 with the cooling air conduit upper member 8.

The cooling air distributor unit 13, 14 leads to the cooling air outlets 4, 5.

The cooling air conduit upper and lower members 7, 8 are connected to a common cooling air blower 11 which is illustrated at the lower right side of the drawing. The cooling air fed from the cooling air blower 11 enters at location 12 into the cooling air conduit lower member 7.

The cooling air distributor unit has a cooling air feed device 13 and 14 for each cooling air outlet 4, 5 respectively. The cooling air feed devices 13, 14 are aerodynamically independent of each other (i.e. guide separate flows of air).

The cooling air feed devices 13, 14 although independent of one another are connected to the same common cooling air conduit 7 via rings 8, 8a.

The structure of these devices is such that each cooling air feed device 13, 14 has an air flow control device 15, 16 at the transitional region to the cooling air conduit upper member 8.

Figures 3, 4:
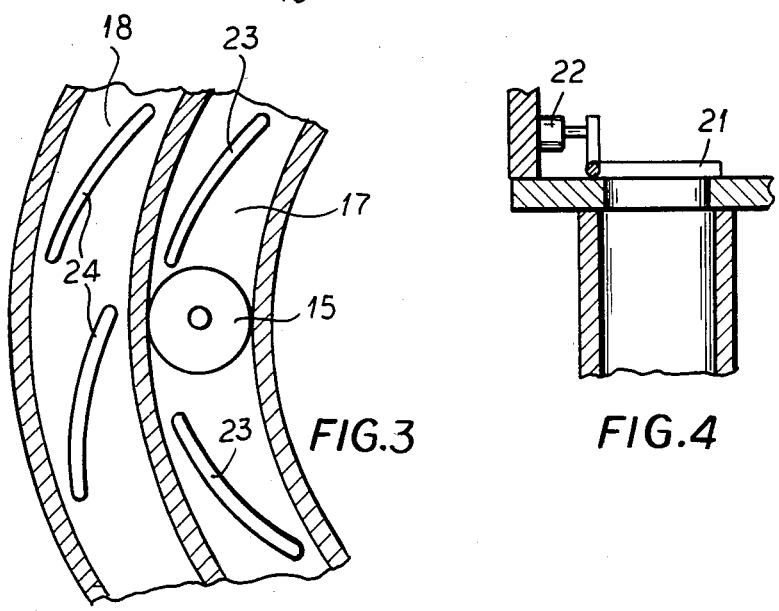
FIG. 3 is a section along lines III—III of FIG. 1.
FIG. 4 is a detail showing another control device according to the invention.

The individual cooling air feed devices 13, 14 have a circumferentially circular distributor chamber 17, 18 downstream of the air flow control devices 15, 16 and, connected to them, distributor ducts 19, 20 leading to the cooling air outlets 4, 5. The lower one of the distributor ducts 19 leads directly to its cooling air outlet 4, the upper one of the distributor ducts 20 leads to its cooling air outlet 5 indirectly by an additional distributor chamber 21. The air flow control device 15, 16 may be an apertured partition or diaphragm and/or a flap valve 21 (FIG. 4) with a flap. In FIG. 1 flow control devices 15 and 16 are orifice controls. The flap valves 21, when used, can be routinely adjustable by remote control, e.g. by electrical operation of a servomotor 22.

Figure 2:
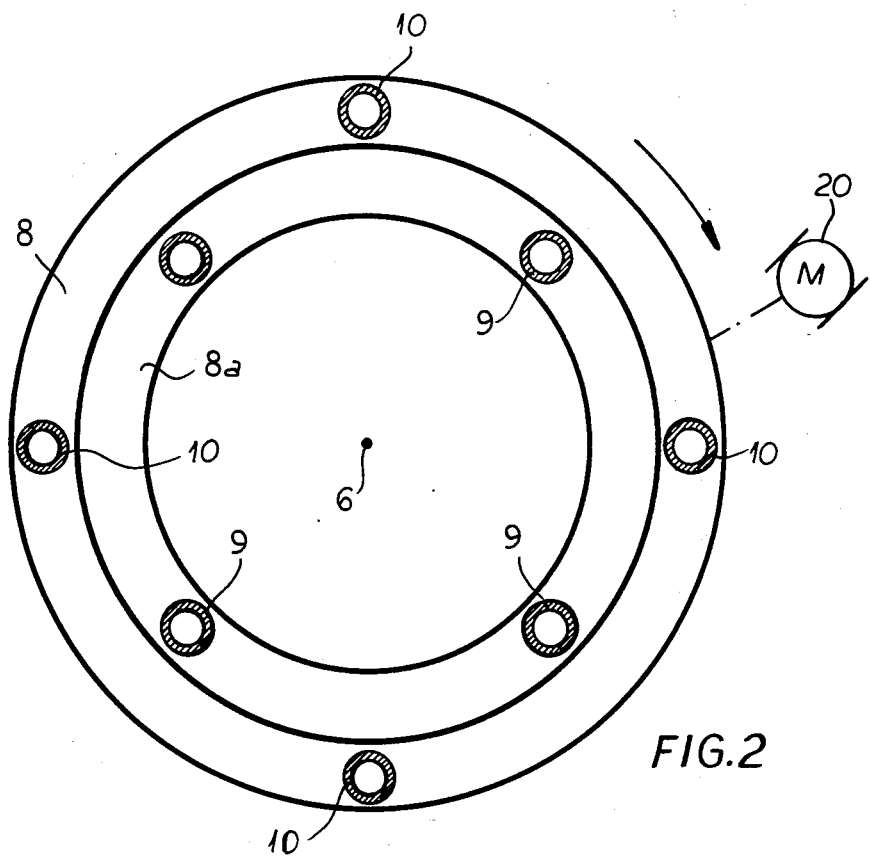
FIG. 2 is a section along lines II—II of FIG. 1.

This example provides a case in which the cooling air feed devices 13, 14 are connected by tubes or pipes 9, 10 which are distributed over its periphery (FIG. 2). It is understood that the inner tubes 9 are usually offset from the outer tubes 10 about the axis 6. In this case each tube 9, 10 opening into the cooling air feed device 13, 14 is associated with a respective air flow control device 15,16. Flow guide structures or baffles 23, 24 can be located in the distributor chambers 17, 18.

The cooling air duct structures include the cooling air conduit upper member 8 and the cooling air conduit lower member 7 by definition.

By definition the cooling air distributor unit includes the cooling air feed devices 13,14.

I claim:

1. In a thermoplastic foil tube-blowing apparatus comprising a rotating extruder head with at least one circular outlet gap for said thermoplastic tube, an air blowing device and a cooling device including at least two circular cooling air outlets surrounding said circular outlet gap of said extruder head the improvement which comprises a cooling air distributor unit having a cooling air feed device for each of said cooling air outlets, said cooling air feed devices being aerodynamically independent of each other and connected to a common cooling air duct structure, and a respective air flow control device for each of said cooling air feed devices, each of said cooling air feed devices having a circumferentially circular distributor chamber downstream of the respective said air flow control device and, connected thereto, a distributor duct leading to one of said cooling outlets directly or indirectly by an additional one of said distributor chambers, and said air flow control device being selected from the group consisting of an aperture diaphragm and a flap valve wherein said air flow control device is remotely adjustable.

2. The improvement defined in claim 1 in which said cooling air feed devices are connected to said cooling air duct structures by a plurality of tubes which are distributed peripherally, and a respective said air flow control device is provided for each of said tubes opening into said cooling air feed devices.

3. The improvement defined in claim 2 wherein flow-guiding baffles are provided in said distributor chambers.

4. The improvement according to claim 2 wherein each of said plurality of tubes has a longitudinal axis traversing a length of said tube, said axis being orthogonal to a flow path of said cooling air duct structure and parallel to a flow path of said circular distributor chamber.

5. The improvement defined in claim 2 wherein one of said air flow control devices is positioned between one of said plurality of tubes and said circular distributor chamber.

6. An apparatus for making a thermoplastic foil by blowing an extruded thermoplastic tube comprising:
    a rotating extruder head with at least one circular outlet gap for said thermoplastic tube;
    an air blowing device; and
    a cooling device including at least;
    two circular cooling air outlets surrounding said circular outlet gap of said extruder head,
        a common cooling air blower,
        a common cooling air duct structure connected to said common cooling air blower,
        a cooling air distributor unit having a cooling air feed device provided for each of said cooling air outlets, each of said cooling air feed devices including a circumferentially circular distributor chamber and, connected thereto, a distributor duct leading to said cooling air outlet directly or indirectly by an additional one of said distributor chambers, said cooling air feed devices being aerodynamically independent of each other and connected to said common cooling air duct structure; and
        a respective air flow control device located upstream of said upstream of said distributor chamber for each of said cooling air feed devices, said air flow control device being selected from the group consisting of an apertured diaphragm and a flap valve wherein said air flow control device is remotely adjustable.

7. An apparatus according to claim 6 further comprising a plurality of tubes, each of said tubes being positioned between a respective air flow control device and said common cooling air duct structure.

8. An apparatus according to claim 7 wherein each of said plurality of tubes has a longitudinal axis wherein one of said air flow control devices is positioned between one of said plurality of tubes and said circular distributor chamber.

* * * * *